United States Patent [19]

Wills et al.

[11] 3,983,947
[45] Oct. 5, 1976

[54] VALVE AND HANDLE FOR AN AIR OPERATED TOOL, AND METHOD OF FLUID CONTROL

[76] Inventors: William Richard Wills, 3 Dunscombe Court, Phoenix, Md. 21131; Hanspeter Ehrenfried Beisch, 120 Royal Oak Drive, Belair, Md. 21014; Thomas Sukru Fenari, 605 Stacy Court, Towson, Md. 21204

[22] Filed: Sept. 24, 1974

[21] Appl. No.: 508,897

[52] U.S. Cl. .............................. 173/169; 222/327; 222/389
[51] Int. Cl.² ........................................ B65D 85/72
[58] Field of Search ............ 173/169; 222/327, 389

[56] References Cited
UNITED STATES PATENTS

| | | | |
|---|---|---|---|
| 1,812,643 | 6/1931 | Albertine | 222/389 X |
| 1,851,926 | 3/1932 | Butler | 173/169 X |
| 1,856,372 | 5/1932 | Buchet | 173/169 X |
| 2,007,707 | 7/1935 | Dodge | 222/327 X |
| 2,183,013 | 12/1939 | Davis | 222/389 X |
| 2,692,706 | 10/1954 | Wiksten | 222/389 X |
| 2,822,002 | 2/1958 | Mack | 222/389 X |
| 2,838,210 | 6/1958 | Detrie et al. | 222/389 X |
| 3,087,466 | 4/1963 | Tobias | 173/169 X |
| 3,094,901 | 6/1963 | Wandel et al. | 173/169 X |
| 3,237,814 | 3/1966 | Collar | 222/327 |

*Primary Examiner*—Ernest R. Purser
*Assistant Examiner*—William F. Pate, III

[57] ABSTRACT

A combined handle and valve particularly, for piston type pneumatic tools is disclosed. The valve is positioned in a passageway between the supply and a vent to atmosphere. Another passageway starts between the valve and the supply and goes to a point of use. Thus, by throttling the exhaust, the amount of air not exhausted is directed to do useful work. The handle is extremely compact and comprises an annular port around the rear end of the cylinder.

5 Claims, 5 Drawing Figures

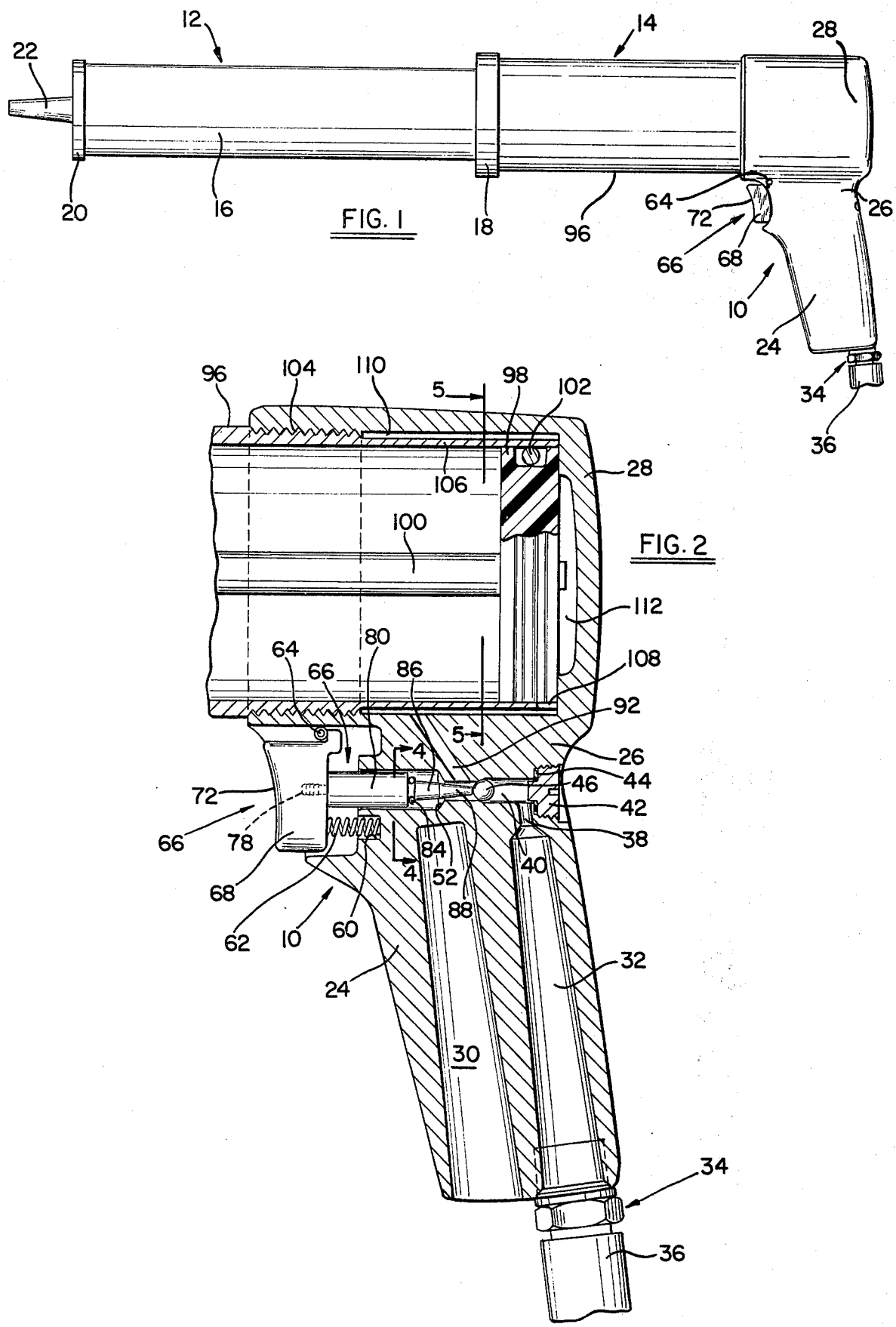

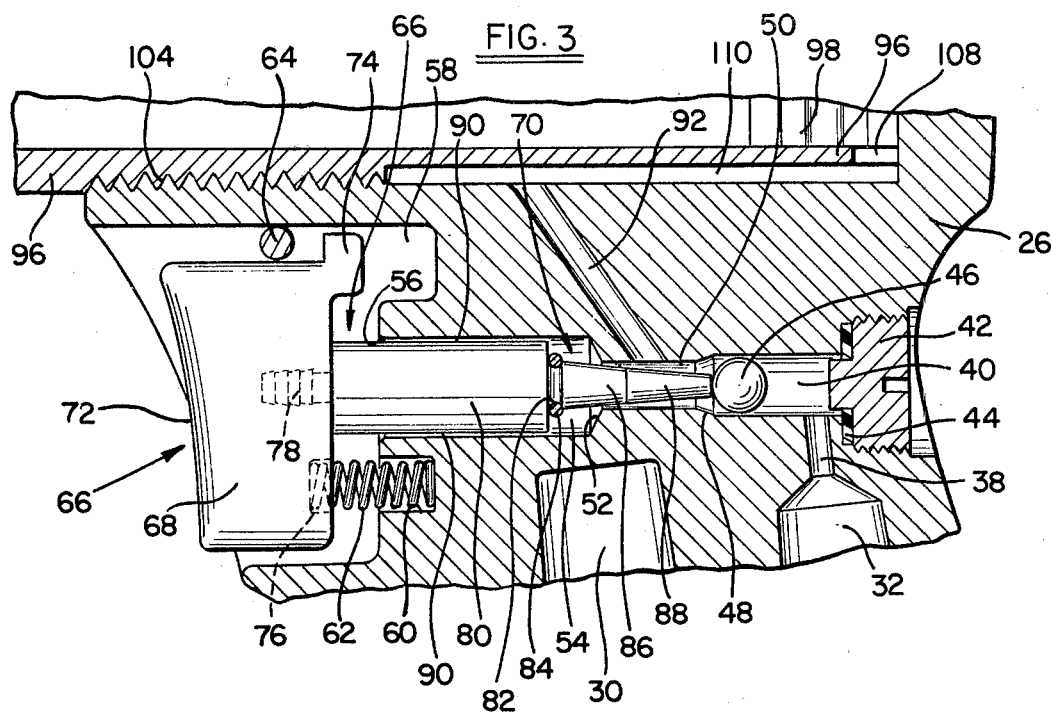

VALVE AND HANDLE FOR AN AIR OPERATED TOOL, AND METHOD OF FLUID CONTROL

This invention relates to a method of fluid control; and to air operated tools, and particularly to such tools which utilize a piston. Caulking guns, grease guns, and the like, are typical of such applications.

In its most general apparatus form, the invention comprises an improved pistol grip type of handle with an integral valve. The handle and valve can be used in various applications to control conventional air tools, such as screwdrivers, air drills, and the like. When used in conjunction with a tool having a piston, the handle of the invention includes improved manifolding, whereby a highly compact rear end of the tool is provided. As a method, the invention comprises means to provide fine control of a low flow stream at relatively high pressure, and over a relatively wide range of pressures.

The invention was developed specifically for use as a power operated caulking gun. However, it is considerably broader in its potential scope of application. For example, the invention could be used to control air tools generally, and in piston type devices, could be used as a grease gun, to extrude dough and the like edible materials such as in production work in bakeries, and in various other applications which will be apparent to those skilled in the art. Therefore, the term "caulking gun" and the like, as used throughout this specification and claims herein shall be understood to be exemplitive of all such areas of potential use, and shall not limit the invention specifically to use in caulk guns.

Similarly, in regard to the valve portion of the invention, the output passageway could be connected to any application, such as the types set forth above, and others which will present themselves to those skilled in the valving arts. Therefore, the terms "point of use" and the like as used in the specification and claims herein shall be understood to mean any application to which the invention valve may be applied. The invention was developed for use with air as the working substance. However, it is also applicable for use with water, other gases, and other liquids. Thus, the word "fluid" as used in the specification and claims herein shall be understood to include use of the invention with any and all such substances.

The prior art of power operated piston devices, and especially caulking guns, is quite old and highly developed. However, they all suffer from one or more of various problems, which are overcome by the present invention. One general area encompassing a number of problems has to do with physical size and shape of the rear end handle. Caulk guns are generally elongated cylindrical devices, due to the need to accommodate an elongated tube of caulk and the piston with its associated cylinder and manifolding. Many prior art devices use lever type of operating switches which are located or disposed generally parallel to the axis of the tube. This structure suffers from the disadvantage that the control mechanism must be located in tandem with the cylinder, thereby lengthening the tool overall, increasing its weight, and making it more clumsy to use. Other types of devices utilize a trigger type of switch, but frequently do not include an integral valve, as does the invention. In these types of tools, again, the mechanism is located either in an extremely bulky handle or axially in line with the cylinder which, again, increases the weight and clumsiness of the tool. Some such devices have external tubes and the like which present the possibility of damage, and again, decrease the usefulness of the tool.

In contrast thereto, the present invention provides a highly streamlined, lightweight, one-piece handle which receives the end of the tube and adds virtually nothing to overall tool length, and which includes the integral valve of the present invention.

Prior art valves almost universally operate directly upon the inflow air to control the piston. These valves also include complicated mechanisms for reversing the piston under power, which complicates the valve's manifolding. An associated problem in piston type devices is the desirability of a fine control and no "coasting" of the piston after the air supply is shut off. Such additional motion of the piston after the user has stopped his useful work will cause an additional minor amount of material to be extruded, which is highly undesirable both from the point of view of wasting material and causing a sloppy condition around the work area. In caulking guns, this condition is known as "drool" or "bleed." In direct supply control valving systems, the "drool" problem is difficult to control, in that after the valve is shut off a certain amount of pressurized air is still present, and that trapped pressurized air may expand enough to cause the spilling or "drooling" condition. Another problem in direct air control is that sensitivity and low flow rates, and particularly sensitivity at such low flow rates, is difficult to achieve. That is, when working with caulking guns, it is often desirable to extrude a thin bead, and to do so slowly, in order to accommodate a difficult caulking situation. In a direct flow control system, as soon as the valve is cracked, the relatively high pressure rushes through, and thus tends to rapidly start driving the caulk out of the tool at a relatively high rate.

The present invention does not operate on the supply directly. The invention controls the useful work by controlling the exhaust bypassed around the work. That is, the supply is split such that if more air is exhausted, then correspondingly less air will do useful work, and vice versa. Thus, conceptually, the present invention reverses the prior art and the conventional wisdom.

Further, the valve is not merely an on-off device, but includes means to throttle or control the amount of air exhausted, to thereby indirectly control the amount of air which is passed on through the valving and manifolding to do useful work. The invention valve also includes check means to close the air supply, whereby, when the trigger is in the off position, the air supply is sealed, and the tool does not continuously exhaust air. Thus, the invention system solves the prior problem of "drool" by permitting the pressurized air behind the working piston to exhaust immediately upon the trigger being returned to the off position. No working fluid is trapped. That is, when the trigger is turned off, the piston stops instantly and does not move any further, the live air behind the piston exhausting to atmosphere through these usual exhaust means, the check means serving to close off the air supply, thus bringing the space behind the piston and the exhaust means into communication with each other.

The above and other advantages of the invention will be pointed out or will become evident in the following detailed description and claims, and the accompanying drawing also forming a part of the disclosure in which:

FIG. 1 is an elevational view of the invention as embodied in a caulking gun;

FIG. 2 is a vertical cross-sectional view of the invention valve and handle with the valve at rest;

FIG. 3 is an enlarged showing of the valve in an operated position; and

FIGS. 4 and 5 are cross-sectional views taken on lines 4—4 and 5—5 respectively of FIG. 2, and showing details.

Referring now to FIG. 1, there is shown a caulking gun 12 in general outline. FIG. 1 is a very general showing only, illustrating but one environment, a caulking gun, with which the invention can be used. Gun 12 comprises the invention handle portion 10, a power cylinder 14 and a front cylinder 16 joined thereto by suitable joining means 18. Mounting means 20 are provided at least partially at the front end of caulk tube cylinder 16 for mounting a standard caulk tube 22 therein. Gun 12 is designated to operate with conventional commerically available tubes of caulking compound. As is known, such tubes are sold in various sizes, and the invention can be sized appropriately.

Referring now to FIG. 2, handle portion 10 preferably comprises a single casting having a handle section 24, a trigger and valve section 26, and a top cylinder receiving section 28. Handle section 24 is of the general pistol grip variety to fit comfortably in the hand of an operator. It is formed with a blind cavity 30 for purposes of lightening the part, and is also formed with a passageway 32 for the air supply. A suitable fitting 34 is provided in the lower end of passageway 32, and an air supply hose 36 is attached thereto, all in the conventional manner. The upper end of the supply passageway 32 is formed into a reduced diameter passageway 38 which communicates with the cross-opening 40 in the trigger section 26. The hose 36, by being attached to the butt end of the handle, as compared to prior tools wherein the hose is attached in line with the cylinder, greatly improves user convenience and comfort by being completely out of the user's way during normal working with the tool.

Cross-opening 40 extends through from side to side, left to right, of the "waist" or trigger section of the handle. The opening is of composite configuration to serve various purposes as will be set forth below. The righthand end of the through opening 40 is sealingly closed off by means of a plug or set screw 42 and a sealing gasket 44, both of any suitable structure. Beyond plug 42, passageway 40 comprises a chamber to which the supply passageways 32 and 38 communicate. A ball valve member 46 is located for free motion in this chamber. The front or left side of the chamber is formed with a ball seat 48 in the form of a conical surface or counterbore, which opens towards or faces the supply 38. A throat section 50 connects the seat 48 with a throttling section and valve seat 52. To the left of portion 52, the composite passageway 40 comprises a chamber 54 which serves to guide the motion of the trigger, and as a vent passageway, both described below. The left side of chamber 54 communicates via a relief opening 56 with an enlarged shaped opening 58 adapted to receive the trigger member itself. Trigger section 26 also is formed with a small recess 60 which receives one end of a compression spring 62. A stop member, in the form of a bar or roll pin, is fixed in position in the trigger section 26, and bridges across the trigger chamber 58.

A trigger assembly 66 is included in the trigger section 26, and is guided in the composite opening 40. Assembly 66 comprises a trigger member 68 to which is joined a valve member 70. Trigger member 68 is preferably formed of a plastic or the like material, and it comprises an operating face 72 curved and configured for the operator's finger comfort in the usual manner. Further, the trigger member comprises a stop ledge of protrusion 74 which cooperates with the stop 64 fixed in the handle, and a recess 76 which receives the opposite end of the spring 62. Thus, spring 62 normally biases the trigger assembly 66 against the stop 64 by cooperation with the protrusion 74.

The valve member 70 comprises a barb 78 which is permanently fixed in a suitable undersized opening formed in the back of the trigger member 68. Beyond the barb, in order working from left to right, valve member 70 comprises a cylindrical shank or guiding portion 80, an undercut 82 which is seated an O-ring 84, a tapered throttling section 86, and a front end nose 88. Shank 80 serves primarily to guide the motion of the trigger assembly in the handle. It is also formed with a pair of opposed clearance flats 90, see FIG. 4, which act as a vent, as set forth below. The taper in section 86 has been exaggerated in the drawings for clarity.

Means are provided to flow the air as controlled by the valve of the invention from the trigger section 26 to the cylinder section 28. To this end, a bore 92 communicates throat section 50 with the enlarged space inside the cylinder section 28 of the handle 10 via the manifolding described below. The angle of the base 94 is provided to facilitate its drilling, from the outside upper left hand corner as shown in the drawing.

Mounted in section 18 is a cylinder 96 which slidingly receives a piston 98 of any suitable configuration, which piston in turn drives a piston rod 100. Sealing means, such as O-ring 102, are provided in the usual manner. A plunger or the like, not shown, is on the opposite end of piston rod 100, and this plunger drives the caulk out of the caulk tube. Suitable means are provided to permit the piston rod 100 to pass through the joiner means 18. Different means will be provided depending upon the nature of part 18, and such joiner means 18 does not form a material part of the present invention. The plain cylindrical end of the cylinder 96 is modified in several ways for cooperation with handle 10. A threaded section 104 is formed for cooperation with a mating threaded section in the outer end of the generally cylindrical shaped section 28. A seal is formed by these threads, and, if desired, also by suitable sealing compounds at the outside juncture, now shown. The rest of the end of the cylinder 96 is turned down and reduced in diameter from the outside as at 106. The end of the cylinder, in the thin portion 106, is notched as at 108. Thus, there is formed a radial relatively thin annular port 110 completely surrounding the end of the cylinder 96 between the threads 104 and the end wall of the cylinder section 28 of the handle. The port 92 communicates with this annular port 110. The back generally circular wall of the cylinder section 28 is formed with an internal recess 112. The invention's compactness is provided in large measure by this annular manifolding which is positioned between the handle housing and the rear end of the piston cylinder. In effect, the manifolding is "nested" between the handle housing and the cylinder end. In this manner, very little extra space is taken up by the manifolding, whereby the compact handle and valve assembly on the invention is produced.

The chamber 54 and the bore 92 form a Y with respect to the throat 50, which serves to split the incoming pressurized working fluid. When the ball 46 is off its seat, throat 50 is fully pressurized from the supply passageway 32. The trigger assembly 66 and particularly the throttle section 86 thereof, controls the amount of flow which is allowed to exhaust around the trigger, and of course, that air which is not exhausted flows through the passageway 92 and does useful work; in the embodiment shown, it drives the piston. In other embodiments or environments, the useful work could be driving an air motor, driving a piston for various purposes including control purposes, and extruding other materials, or doing inflating work, or the like, as set forth above.

OPERATION

In the off position of FIG. 2, the line pressure is present in the passageways 32, 38 and 40, and urges the ball 46 against its seat 48. Thus, all of the passageways to the left of the ball 46 are not pressurized. In the successfully constructed embodiment, the entire handle was machined from an aluminum casting, and the ball 46 was steel. Ball 46 in its seat 48 functions as a check valve, to stop any flow of air through the tool when the trigger is off. It is desirable to use as small a ball as possible in order to minimize the total force built up behind the ball which must be manually overcome in opening the valve. Another incidental consideration is that it is preferred that the included angle defined by the seat 48 be no more than about 30° because the narrower angle improves the wedging action of the ball on its seat. In assembling the parts, it was found desirable to tap the ball lightly against the seat to "run-in" or "break-in" the check valve for its future smoother operation.

When it is desired to commence work, the operator depresses the trigger assembly 66, thereby causing the nose portion 88 of the valve member 70 to unseat the ball 46. When the valve is thus just "cracked," the smallest diameter of the throttling section 86 is in position at the throttle section and seat 52. Thus, full line pressure is present in chamber 50. However, most of the flow is bypassed between the smallest part of throttle section 86 and opening 52. Only a small part of the flow passes through passageway 92, then through the annular port 110, and then through the notch 108. The function of the notch is now apparent, it permits controlled leakage from the port 110 to seep behind the piston 98 when it is in its fully retracted position and flush against the end wall of the cylinder mounting section 28. The leakage behind the piston seeps to the recess 112 where it quickly builds up sufficiently to start the piston moving.

Returning to the description of the control action, the invention achieves the usual modus operandi of increased trigger pressure producing increased work. However, it is accomplished inversely, that is, as the trigger is further and further depressed, more and more of the supply air is diverted to do useful work because less and less of that supply air is permitted to vent to atmosphere through the throttle opening and valve seat 52. As is clear from a comparison of FIGS. 2 and 3, as the trigger is further depressed, ever larger cross-sectional areas in the throttle section 86 are present at the throttle opening 52, thereby correspondingly decreasing the cross-sectional area available for working fluid to flow out through that annular orifice to atmosphere via flats 90 and around the trigger. The air bled out passes around the outside of the section 86, and thence past the space provided between the flats 90 on the shank section 80, see FIG. 4. The fit between the trigger member 68 and the trigger recess 58 formed in the handle is such that the air escapes harmlessly around the trigger. When full flow is desired, the trigger is depressed all the way in and the O-ring 84 at the large end of the throttle section 86 seats against the valve seat 52, thereby cutting off the exhaust flow and permitting the full supply through passageway 92 to do useful work.

When the piston 98 has moved all the way to the left, beyond the showing of the drawing, and has exhausted the caulk tube, the piston is returned to the starting position manually. The end of the next caulk tube can be used for this purpose, or various means could be used to permit this mode of operation, as will be evident to those skilled in the art. By so doing, the porting and manifolding is considerably simplified in that no means is provided to deliver pressurized air to the forward end of the piston, i.e., a power return stroke is not provided.

The strength of the spring 62 plays a role in operator convenience in using the tool, that is, in human engineering the tool. This strength is selected in conjunction with the total cross-sectional area of the ball 46 and the line pressure used, whereby the total force required to crack and use the valve is selected so as to give the operator a suitable feedback and comfortable feel while at the same time not requiring any excess force to operate the valve which might tire the user.

The invention indirect control system has been found to be particularly useful in caulking guns and the like, because low flows and relatively fine control of the low flow, are required. In direct flow systems, working with conventional line pressures, the least cracking of the valve allows the full pressure in, and flow control is difficult to achieve at the low rates. The usual solution in the prior art is the addition of separate regulating means. In the present invention, the least cracking of the valve permits most of the flow to escape, thereby obtaining the sensitivity or fine control at low flow rates to the point of use, and with ordinary line pressures. A corollary advantage is that when the valve is turned off by the user releasing the trigger and the spring returning it to the FIG. 2 position, then the ball immediately seals off the supply pressure, and the air still in the passageway 92 and in the annular port 110 and recess 112, and the substantial amount of air behind the piston when it is an intermediate position in the cylinder are permitted to bleed to atmosphere through and around the throttle section 86 of the invention valve. In this manner, this residual pressure harmlessly bleeds away and does not cause any additional motion of the piston. Thus, when the operator releases the trigger, the extrusion of caulk or other material or other useful work stops immediately, and there is no "drool" or "coasting" or undesired additional work due to such residual pressure, as is common in prior art devices.

In testing the invention with ordinary caulking compounds, prototype tools operated at supply pressures of up to about 65 psi and at flows of about 0.2 cfm. In commercial and other uses dependent upon what material is being operated upon, it is anticipated that pressures between about 10 and about 100 psi at flows between about 0.1 and about 1.0 cfm could be used. The above numbers refer to total supply, not merely to amount of fluid used or amount exhausted.

Thus, in summary of the operation of the invention valve, it can be seen that it comprises a point of commonality, the throat 50 as shown in the drawings, with two passageways extending from the point of commonality; one to a vent (around the trigger) and the other to a point of use (the piston). The invention further comprises valve means, (valve member 70) in one of these passageways after the common point to control the amount of fluid vented to thereby indirectly control the amount of fluid directed to the point of use.

While the invention has been described in detail above, it is to be understood that this detailed description is by way of example only, and the protection granted is to be limited only within the spirit of the invention and the scope of the following claims.

We claim:

1. A fluid operated tool comprising a one-piece pistol grip handle and cylinder cap, a trigger on said handle, said cylinder cap having an open front end, a cylinder detachably secured within said cylinder cap and having a piston slidable therein, said cylinder having a reduced outer diameter rearward end forming an annular port surrounding said rearward cylinder end, said cylinder having its terminal inner edge in abuting engagement with said cylinder cap and being provided with notch means communicating said annular port and said cylinder, a pressurized fluid inlet in said handle, passage means in said handle connecting said inlet and said annular port, a ball check valve in said passage means normally preventing flow of pressurized fluid to said annular port, valve means operable by said trigger to open said check valve, said valve means including a tapered projection extending into a cylindrical bore forming a part of said passage means, said cylindrical bore communicating with the atmosphere, whereby initial movement of said trigger unseats said ball check valve and communicates an inlet in said annular port, and continued movement of said trigger past said initial movement brings the larger part of said tapered projection into said cylindrical bore and progressively restricts communication of said cylindrical bore with the atmosphere.

2. The combination of claim 1, said valve member comprising a guiding shank portion fitted into an opening in said handle and connected to said tapered projection and said vent means comprising a pair of flats formed in said guiding shank portion.

3. The combination of claim 1, said tool comprising a pneumatic caulking gun.

4. The combination of claim 1, including an O-ring seal mounted on said valve member at the largest diameter portion of said tapered portion, and a valve seat formed around said cylindrical bore for cooperation with said O-ring seal, whereby all of the air from said supply is flowed through said passage means to said annular port when said trigger is fully depressed to bring said O-ring seal into contact with said valve seat.

5. The tool of claim 1 wherein said cylinder has an intermediate portion threaded into the outer end of said cylinder cap, the rearward end of said cylinder being turned down from said threaded portion.

* * * * *

UNITED STATES PATENT OFFICE
CERTIFICATE OF CORRECTION

Patent No. 3,983,947         Dated October 5, 1976

Inventor(s) William Richard Wills, Hanspeter Ehrenfried Beisch, Thomas Sukru Fenari It is certified that error appears in the above-identified patent and that said Letters Patent are hereby corrected as shown below:

On the title page of the patent, please enter the following after the names of the inventors.

Assignee: The Black and Decker Manufacturing Company, Towson, Maryland

Signed and Sealed this

Twenty-eighth Day of December 1976

[SEAL]

Attest:

RUTH C. MASON
Attesting Officer

C. MARSHALL DANN
Commissioner of Patents and Trademarks